(12) United States Patent
Freen et al.

(10) Patent No.: US 9,088,973 B1
(45) Date of Patent: Jul. 21, 2015

(54) SYSTEMS AND METHODS FOR SUBSCRIBER-CENTRIC DYNAMIC SPECTRUM MANAGEMENT

(71) Applicant: Bridgewater Systems Corp., Ottawa (CA)

(72) Inventors: Russ Freen, Ottawa (CA); Eamonn Garry, Manotick (CA); Tyler Nelson, Kanata (CA); Parham Momtahan, Ottawa (CA)

(73) Assignee: Bridgewater Systems Corp., Ottawa (CA)

( * ) Notice: Subject to any disclaimer, the term of this patent is extended or adjusted under 35 U.S.C. 154(b) by 258 days.

(21) Appl. No.: 13/724,918

(22) Filed: Dec. 21, 2012

Related U.S. Application Data

(62) Division of application No. 11/873,187, filed on Oct. 16, 2007, now Pat. No. 8,363,546.

(60) Provisional application No. 60/851,759, filed on Oct. 16, 2006.

(51) Int. Cl.
*H04W 72/04* (2009.01)

(52) U.S. Cl.
CPC ...................... *H04W 72/04* (2013.01)

(58) Field of Classification Search
CPC ............... H04W 28/16–28/26; H04W 72/048; H04W 72/0493; H04W 72/1257
USPC ......... 370/229–235, 328–338, 400, 401, 468; 709/223–226
See application file for complete search history.

(56) References Cited

U.S. PATENT DOCUMENTS

| 2003/0074443 A1* | 4/2003 | Melaku et al. ................ 709/224 |
| 2007/0243879 A1* | 10/2007 | Park et al. .................... 455/453 |

* cited by examiner

*Primary Examiner* — Pao Sinkantarakorn
(74) *Attorney, Agent, or Firm* — Zilka-Kotab, PC

(57) ABSTRACT

A radio spectrum management system is provided. In an embodiment, the radio spectrum management system includes a radio spectrum gateway, a radio spectrum management server and a radio spectrum policy decision server. The radio spectrum gateway is coupled to a radio access network that receives bandwidth requests from subscriber devices and provides bandwidth allocation decisions to the radio access network. The radio spectrum management server receives bandwidth requests from the radio spectrum gateway and provides bandwidth allocation decisions to the radio spectrum gateway based on radio resources and bandwidth policy decisions. The radio spectrum policy management server provides bandwidth policy decisions to the radio spectrum server. The bandwidth policy decisions are generated based on consideration of subscriber and/or application service provider characteristics. Methods for allocation of radio spectrum for a subscriber within a wireless network when the subscriber requests an application are also provided.

5 Claims, 9 Drawing Sheets

300

Entitlements ~330

| | Weekday | Weekend |
|---|---|---|
| Morning | Silver | Bronze |
| Midday | Bronze | Gold |
| Night | Gold | Bronze |

Allowed Device IDs ~320
- IMEI: 35-209900-176148-1
- IMEI: 23-555554-111111-1

Allowed ID ~310
- MSISDN: 16701234567890

Allowed Service Types ~340
- RT, Video, Conversation

Satisfaction Level ~360
- Medium

Previous Flows ~350

| Time | Request | Status |
|---|---|---|
| Weekday Morning | Sports | Allowed |
| Weekday Midday | Sports | Denied |
| Weekday Night | Conversation | Allowed |

Current RAN Capabilities ~370

| Uplink | 10 Mps |
|---|---|
| Downlink | 10 Mps |

Current Device ID ~382
- IMEI: 23-555554-111111-1

Current Service Types ~386
- Conversation

Current Bandwidth Allocation ~390

| Uplink | 1 Mps |
|---|---|
| Downlink | 2 Mps |

Roaming Status ~380
- Active

Device Capabilities ~384

| Uplink | 20 Mps |
|---|---|
| Downlink | 20 Mps |

IP Address ~388
- 2001:a233:456b:8888::

Signal Quality ~392
- High

FIG. 3

Services

| ID | Type | IP Address | QoS Upstream | QoS Downstream | Entitlement |
|---|---|---|---|---|---|
| Sports | Video | 2001:a123:456b:2222:: | 0.1 Mps | 10 Mps | Bronze |
| News | Audio | 2001:a563:456b:9992:: | 0.1 Mps | 0.5 Mps | Silver |
| Conversation | Conversation | 2001:a233:456b:8888:: | 0.2 Mps | 0.2 Mps | Gold |

SYSTEMS AND METHODS FOR SUBSCRIBER-CENTRIC DYNAMIC SPECTRUM MANAGEMENT

This application is a divisional application of U.S. application Ser. No. 11/873,187, filed Oct. 16, 2007, which claims the benefit of U.S. Provisional Application No. 60/851,759, filed Oct. 16, 2006, entitled Systems and Methods for Subscriber-Centric Dynamic Spectrum Management, the entire contents of which are incorporated herein by reference.

BACKGROUND OF THE INVENTION

1. Field of the Invention

The present invention relates to communications, and more particularly, to spectrum management of wireless communication networks.

2. Background of Invention

An increasingly large number of individuals use portable computing devices, such as laptop computers, personal data assistants (PDAs), smart phones and the like, to support mobile communications. The number of computing devices, and the number of networks that these devices connect to, has increased dramatically in recent years. For example, traditional cellular telephone use and mobility continue to grow as the number of cellular subscribers in the United States exceeded 200M for the first time in 2005, with revenues from roaming services (e.g., services used by a cell phone user in a visited network other than their home network) reaching nearly 4B USD. Similarly, an increasing number of wireless Internet access services have been appearing in airports, cafes and book stores with revenue projected from wireless local area network ("LAN") services to exceed 15B USD in 2007.

A wireless network generally includes many wireless nodes and users trying to gain access to a network. The primary means for controlling access include network access servers ("NAS") and authentication servers. A NAS provides access to the network. A primary authentication server, such as an authentication, authorization, accounting (AAA) server, provides centralized authentication services to a NAS for authenticating client devices before they are granted access to the network. In typical installations, the devices and users are connecting through the NAS to obtain access to a network (e.g., the Internet) via some form of wireless connection. The authentication server is typically a RADIUS (Remote Authentication Dial-In User Service) or Diameter server.

The significant growth in wireless communications and the limited radio spectrum available, requires that service providers more efficiently manage radio spectrum. Currently, radio access networks ("RAN") used to allocate radio spectrum in wireless networks assign radio resources based on generic device considerations and a first-come, first-served basis. Further current state of the art methods for allocating spectrum are based only on class of application (e.g. voice, video, gaming) or device capability/type (basic, standard, high, etc.).

Conceptually spectrum allocation and RAN access can be viewed as being based on two major concepts: physical radio resource allocation at the radio cell and call admission and congestion control at a protocol level using service type and priority. Physical radio resource allocation typically depends on equal basic access rights to set up the required communication channels, physical location and proximity to the radio resources, cell capacity and size.

Call admission and congestion control ("CAC") typically depend on a higher level protocol making admission decisions following basic radio resource allocation based on: cell status in terms of ability to provide basic access and service requested by a user in terms of real-time sensitivity. These approaches are limited in that they do not efficiently assign spectrum and do not ensure a particular level of end-to-end quality-of-service. Furthermore, they are limited in their ability to provide tiered service offerings and dynamically adjusting bandwidth allocations based on subscriber characteristics or service provider characteristics.

What is needed are systems and methods that allocate bandwidth to subscribers based on subscriber and application service provider characteristics in a subscriber-centric manner.

SUMMARY OF THE INVENTION

Exemplary systems and methods provide for subscriber-centric dynamic spectrum management. In particular, the exemplary systems and methods provide for allocating radio spectrum within wireless networks based on knowledge of the entitlements (e.g., service contract) of a wireless subscriber/user, knowledge of the entitlements of an application, and the capabilities of subscriber devices (e.g., handset, laptop). While the specification focuses on wireless systems, the invention is not limited to wireless networks. The systems and methods of the present application can be applied to wireline systems and mixed wireline/wireless networks in which distributed subscribers share bandwidth, for example, within a cable modem network.

Exemplary embodiments can also provide for end-to-end quality of service through packet markings to be used for differentiated services ("diffserv.") Diffserv is a computer network architecture that specifies a simple, scalable and coarse-grained mechanism for classifying, managing network traffic and providing quality of service ("Qos") guarantees on IP networks. The exemplary embodiments can also provide for business methods to analyze subscriber-specific usage patterns to infer optimal geographic/regional spectrum allocation policies.

The benefits of the exemplary embodiments include cost reductions in network operating costs due to the optimization of spectrum allocation. Exemplary embodiments also support providing an optimal user experience by ensuring a particular end-to-end quality of service level that is based on the subscriber's profile and device characteristics. Exemplary embodiments also provide a means for introducing tiered services based on quality of service guarantees and other parameters that can result in greater revenue generation for a wireless provider. Exemplary embodiments provide for the enablement of emergency services based on subscriber entitlement/privileges/priority characteristics.

Exemplary embodiments allow spectrum to be allocated centered on the subscriber profile that includes subscriber class (e.g., gold, silver, bronze, emergency worker) and other possible characteristics such as time of day (e.g., the subscriber has subscribed to morning-bronze and night-gold service, so allocate more spectrum to the device during evening hours.)

Exemplary embodiments optimize spectrum, when a mobile device moves into a high noise (such as, near power lines), or low signal (such as, within a tunnel) environment, where based on the knowledge of that user's application, channels for services that are no-longer viable (e.g., high-resolution video) are de-allocated to optimize for more critical services (e.g., emergency calls)

Exemplary embodiments enable end-to-end QOS deliver via mechanisms such as Diffserv markings, even when the IP traffic from RADIO network is tunneled through in the packet network Exemplary embodiments allow applications to request higher/lower spectrum allocation and based on the intersection of subscriber and application provider profiles/entitlements, additional spectrum is allocated (rather than just based on type of application.) This is very useful for when the application provider and the carrier are independent, but the carrier desires to control radio spectrum based on subscriber entitlements.

Exemplary embodiments can use the existing mechanisms for radio resource allocation and CAC, but can modify the triggering of the mechanisms based on the centralized policy management.

Exemplary embodiments link spectrum allocation and RAN Network Access to Service Access and Quality of Service by mapping the usage of services at the radio resource management level to an overall view of a subscriber maintained in a centralized Policy Management Server and using this mapping to change the bandwidth and codec allocation at the physical radio resource allocation level at the cell.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

FIG. 3 provides a diagram of a subscriber profile, according to an embodiment of the invention.

FIG. 4 provides a diagram of a service provider profile according to an embodiment of the invention.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
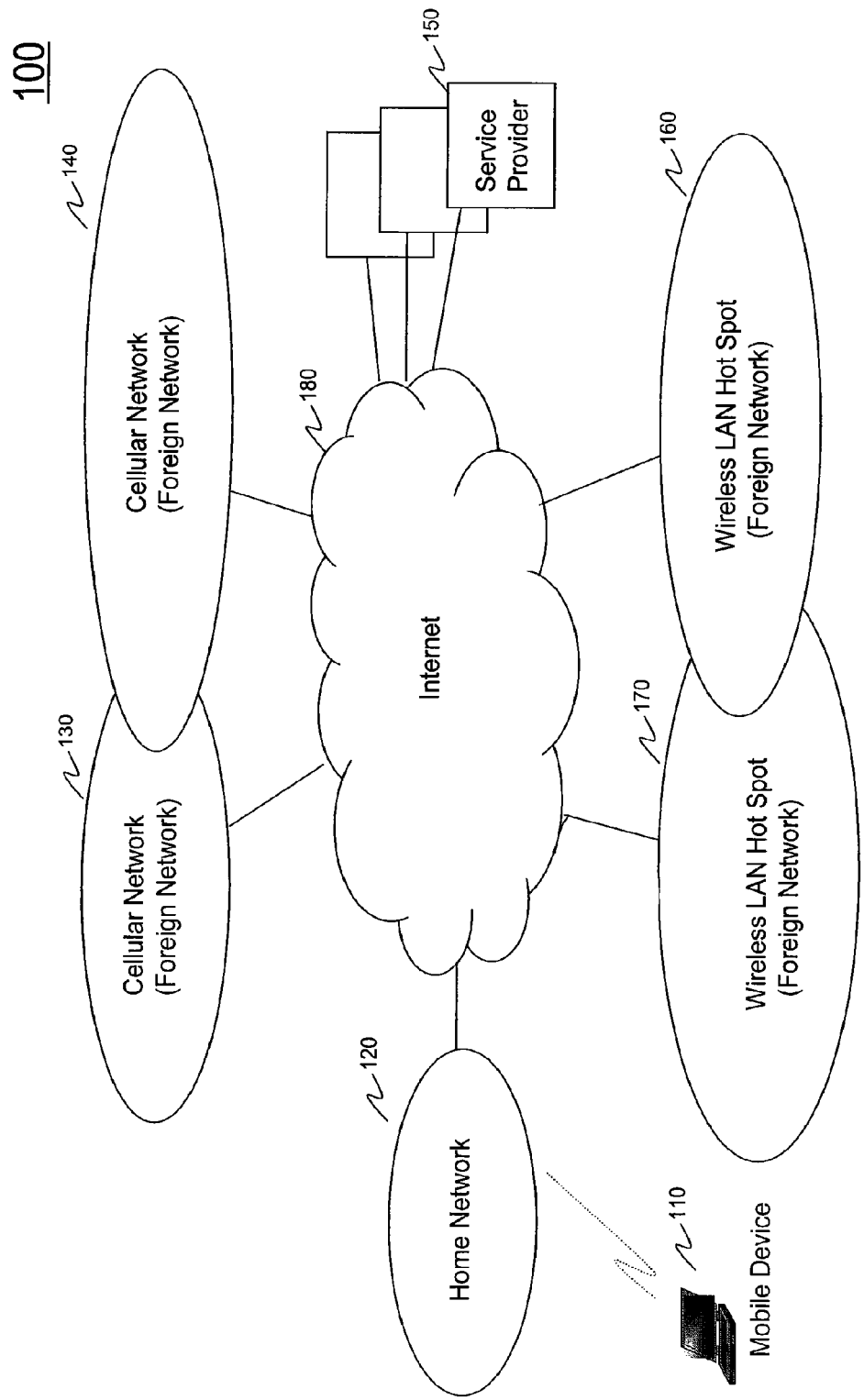
FIG. 1 provides a diagram of a global architecture of the public wireless Internet.

FIG. 1 provides architecture 100 of the public wireless Internet. Architecture 100 includes home network 120, cellular networks 130 and 140, service providers 150, wireless LAN hot spot 160 and 170 and Internet 180. Architecture 100 provides a very simplified diagram of wireless network to illustrate the concepts of a home network and a visited network to highlight the need for authentication procedures. As will be known by individuals skilled in the relevant arts, the present invention can be used on both public and private interconnected wireless networks that require authentication of a mobile device and/or user when that device or user accesses a foreign or visited network that differs from the device or user's home network.

Home network 120 can be any type of wireless network, such as a cellular network or a wireless LAN. Home network 120 represents the home network of mobile device 110. Mobile device 110 can include a laptop computer, a cellular phone, a smart phone, a PDA or other wireless mobile device. Mobile device 110 is shown as currently having a wireless connection to home network 120. As will be known by individuals skilled in the relevant arts, mobile device 110 can roam from one network to another, provided that the proper roaming arrangements are in place between network providers and that mobile device 110 can be properly authenticated when entering a visited or foreign network, such as wireless LAN hot spot 170 or cellular network 140. Each of the networks is coupled through Internet 180. Other types of public and private networks can be used to couple the networks. Mobile device 110 can provide a subscriber services, including application usage. Mobile devices 110 can provide a device identity based on which subscriber and device capabilities can be determined. Mobile device 110 enables subscriber to authenticate.

Figure 2A:
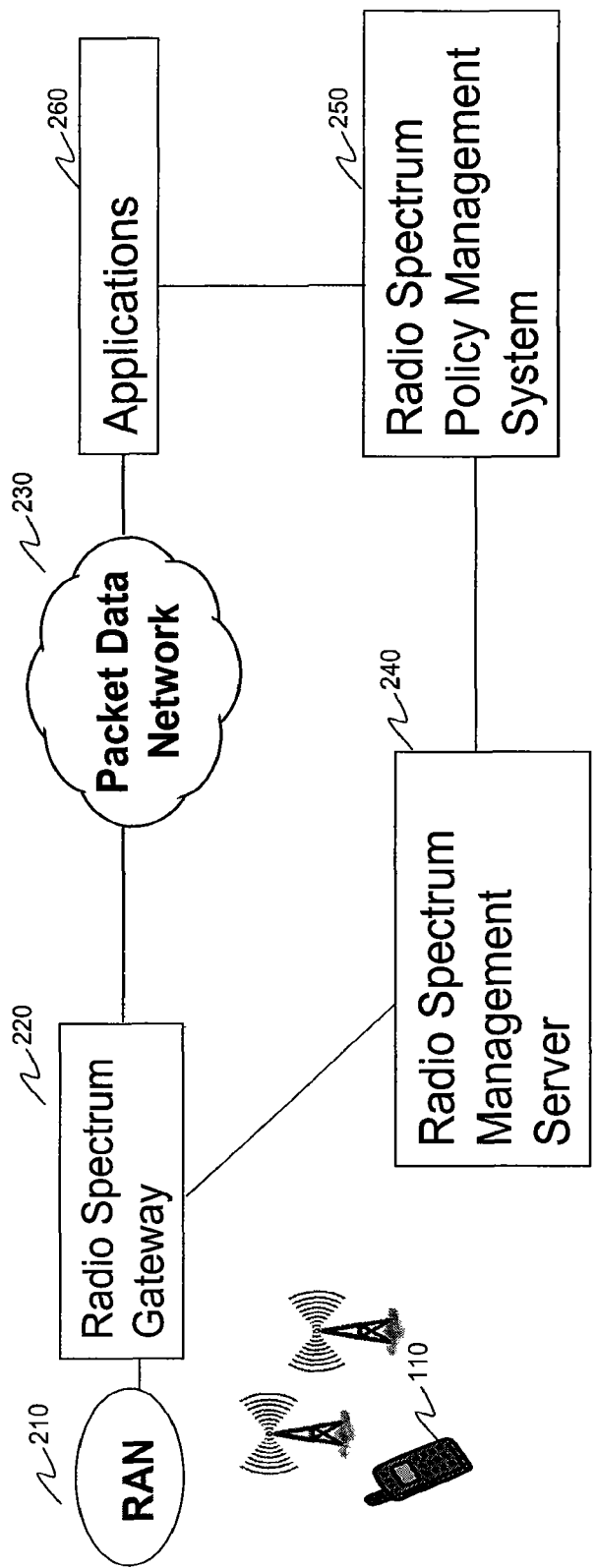
FIG. 2A provides a diagram of a radio spectrum management system, according to an embodiment of the invention.

FIG. 2A provides a diagram of a radio spectrum management system according to an embodiment of the invention. The radio spectrum management system includes radio spectrum gateway 220, radio spectrum management server 240, and radio spectrum policy management server 250. RAN 210 is a radio access network that allocates wireless resources within a wireless network, such as home network 120 or cellular network 130, for example. Packet data network 230 includes any type of packet data network, such as for example, Internet 180, a private network, and the like. Applications 260 provide content to the subscriber devices.

Radio spectrum gateway 220 is coupled to RAN 210. Radio spectrum gateway 220 receives access requests from subscriber devices and provides bandwidth allocation and authentication requests to RAN 210. Radio spectrum gateway 220 can be an edge device in an existing RAN Network, e.g. a base station controller ("BSC"), a radio network controller ("RNC") or the overall edge device in a flat wireless network, such as, for example a access service network ("ASN") gateway. Radio spectrum gateway 220 can interface with the base stations or core network components via existing interfaces, if required.

In an embodiment, radio spectrum gateway 220 interfaces with the radio spectrum management server 240 via change of authorization ("CoA") attributes using a standard AAA protocol or a simple real-time control protocol. The CoA attributes can be mapped directly to the class of service already defined in the existing radio setup and can be changed to increase the service of high value subscribers and decrease/modify the service of lower value subscribers to change the amount of bandwidth that will be allocated at any given time.

Radio spectrum management server 240 can function as a client of radio spectrum policy management server 250.

Radio spectrum gateway 220 can use a counter to determine how bandwidth should be allocated. Radio spectrum gateway 220 can handle conflicts and congestion control via deferral to radio spectrum policy management server 250 for bandwidth allocation decisions.

Radio spectrum management server 240 provides spectrum allocation requests to the radio spectrum gateway 220. Radio spectrum management server 240 seeks to optimize the spectrum allocated to a user based on one or more of a subscriber profile, the subscriber's device, and the service requested. In some cases the resource admission function of radio spectrum manager server 240 may be optional if such function is provided in radio spectrum gateway 220. In such cases, radio spectrum gateway 220 may provide an over-ride policy on a per subscriber basis (e.g., for service to emergency personnel).

Radio spectrum management server 240 provides authenticated access authorization, including initial spectrum allocation parameters to radio spectrum gateway 220 based on policy decisions provided by radio spectrum policy management server 250.

Figure 2B:
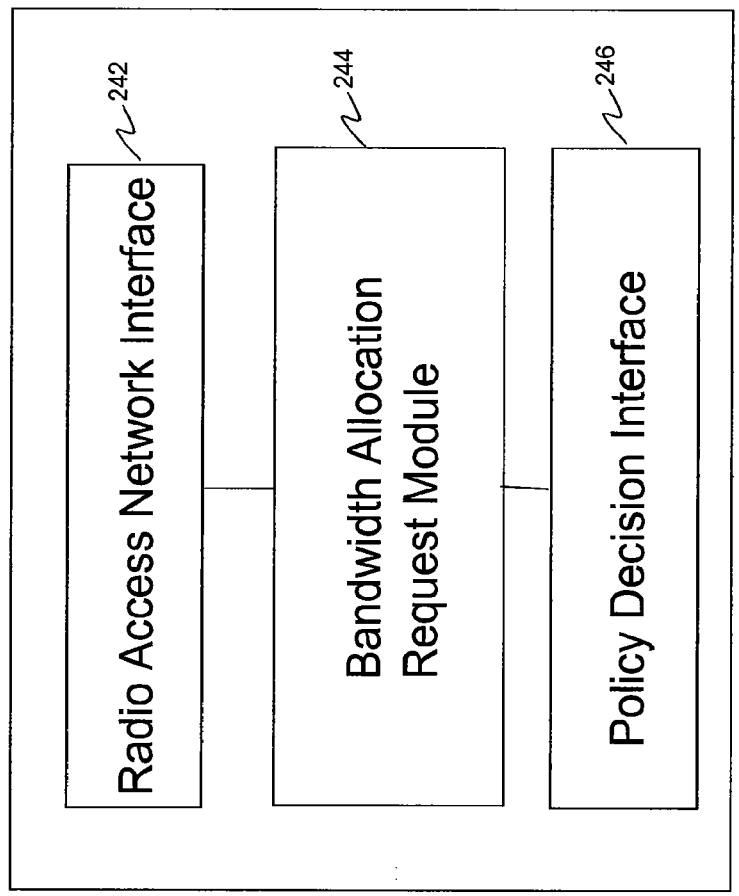
FIG. 2B provides a block diagram of a radio spectrum management server, according to an embodiment of the invention.

FIG. 2B provides a block diagram of radio spectrum management server 240, according to an embodiment of the invention. Radio spectrum management server 240 includes a radio access network interface 242, bandwidth allocation request module 244 and policy decision interface 246. Radio access network interface 242 enables radio spectrum management server 240 to be communicatively coupled to one or more radio access networks, such a RAN 210. Policy decision interface 246 enables radio spectrum management server 240 to be communicatively coupled to radio spectrum policy management server 250 that generates policy decisions.

Bandwidth allocation request module 244 provides bandwidth allocation instructions to one or more radio access networks. The instructions instruct radio allocation devices as to the amount of bandwidth to allocate to a user. Bandwidth allocation decision module 244 determines bandwidth allocation instructions based on a policy decision that factors in subscriber characteristics reflected in policy decisions received from radio spectrum policy management server 250 and radio resource events.

Radio spectrum management server 240 can be a new network element or an existing element behind the core network. In an embodiment, the functions of radio spectrum management server 240 are integrated within radio spectrum policy management server 250.

Radio spectrum management server 240 can interface with the radio spectrum gateway 220 through radio access network interface 242 via a higher level AAA protocol, such as Radius or Diameter. Radio spectrum management server 240 can use CoA messaging and attributes to force changes in the local service level.

Radio spectrum server 240 can interface with the radio spectrum policy management server 250 through policy decision interface 246 via a higher level AAA protocol, such as Radius or Diameter, with proxyied messaging used to simplify the overall change of command.

Figure 2C:
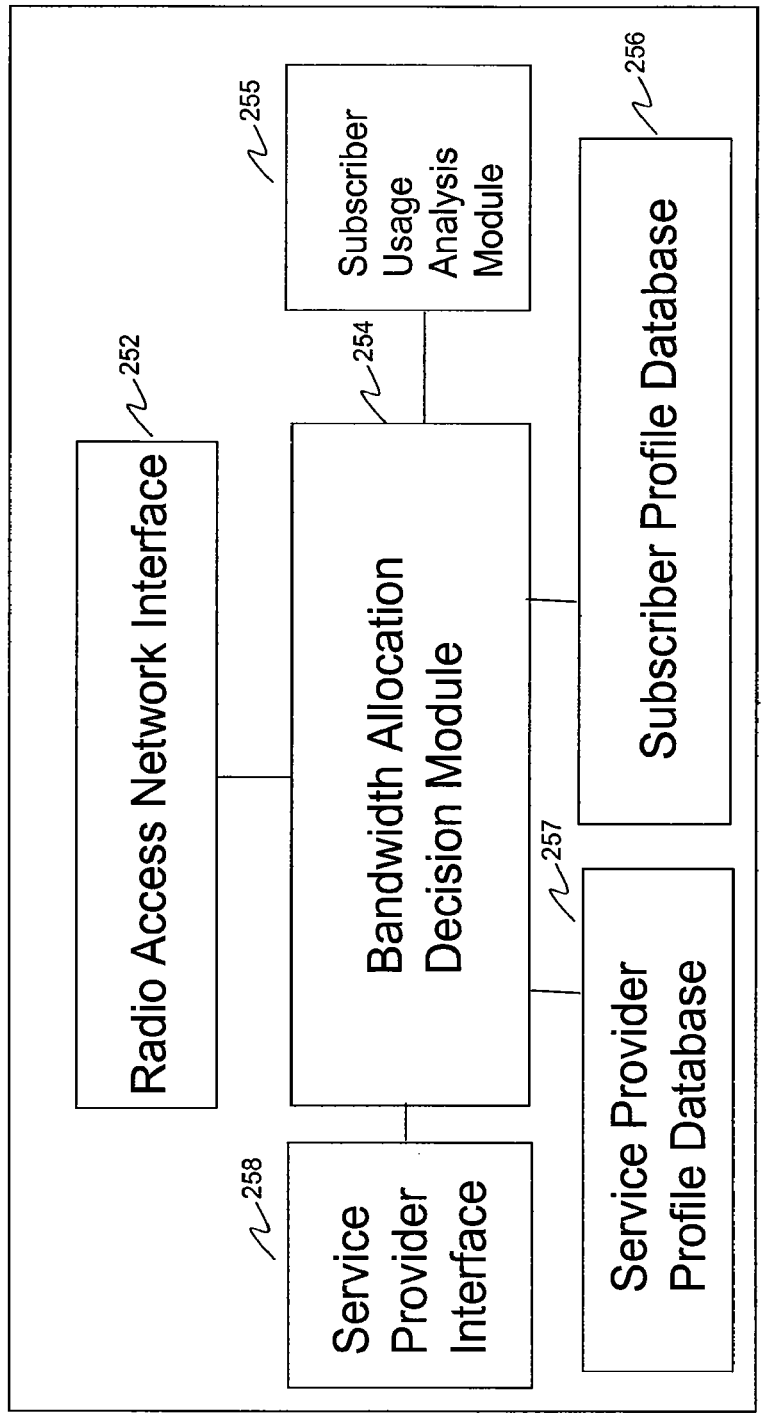
FIG. 2C provides a block diagram of radio spectrum policy management server, according to an embodiment of the invention.

Radio spectrum policy management server 250 provides bandwidth allocation policy decisions to radio spectrum management server 240. Radio spectrum policy management server 250 can reside as a stand-alone system or within a policy management complex, such as, for example an AAA server. FIG. 2C provide a block diagram of radio spectrum policy management server 250, according to an embodiment of the present invention. Radio spectrum policy management server 250 includes radio access network interface 252, bandwidth allocation decision module 254, subscriber usage analysis module 255, subscriber profile database 256, service provider profile database 257 and service provider interface 258.

Radio access network interface 252 enables the radio spectrum policy management server 250 to be communicatively coupled to one or more radio access networks.

Bandwidth allocation policy decision module 254 determines bandwidth allocation policy decisions based on subscriber characteristics and/or service provider characteristics.

Subscriber profile database 256 includes subscriber characteristics. The subscriber characteristics include one or more of subscription information, historical usage information and current usage information. Subscription information includes entitlements, allowed service types, allowed device identifiers, allowed subscription identifiers and billing information. Historical usage information includes a record of a subscriber's previous service request and the treatment thereof, and satisfaction level. Current usage information includes roaming status, device capabilities, signal quality and current bandwidth allocation. Examples of subscription information, historical information, and current usage information are described below with respect to FIG. 3.

FIG. 3 provides a diagram of subscriber profile 300, according to an embodiment of the invention. Subscriber profile 300 may be stored in subscriber profile database 256, or subscriber profile 300 may be stored remotely from radio spectrum policy management server 250. Subscriber profile 300 can include the following in types of information: allowed identifier ("ID") 310, allowed device ID 320, entitlements 330, allowed service types 340, previous flows 350, satisfaction level 360, current RAN capabilities 370, roaming status 380, current device ID 382, device capabilities 384, current service type 386, IP Address 388, current bandwidth allocation 390, and signal quality 392. Subscriber profile 300 is an exemplary subscriber profile shown for illustrative purposes only and not intended to limit the scope of the invention.

Allowed identifier 310 is an identifier used to identify a mobile subscriber. In the exemplary embodiment, allowed identifier is a mobile subscriber integrated services digital network number ("MSISDN").

Allowed device IDs 320 identifier the mobile devices that a subscriber is allowed to access RAN 210 with. In an embodiment, allowed identifier is an International Mobile Equipment Identifier ("IMEI").

Entitlements 330 identify a subscriber's level of entitlement compared to other subscriber classes during specified time periods. In the exemplary embodiment there are four entitlement levels gold, silver, bronze, and emergency worker, where emergency worker is entitled over gold, silver, and bronze, where gold is entitled over silver and bronze, and silver is entitled over bronze. In an embodiment, the time periods are divided into morning, midday, and nights for weekdays and weekends. Entitlements 330 are based on the subscriber's agreement. For example a gold entitlement may be based on paying a premium over a bronze entitlement.

Allowed service types 340 includes the services a subscriber is allowed to use. In an embodiment allowed services types include, but are not limited to, real-time ("RT"), NonRT, conversational, audio, and video. It would be appreciated by one of ordinary skill in the art that types of services are constantly expanding and can be incorporated into existing networks. Allowed service types 340 are useful in determining whether a request should be denied based on that fact that the subscriber is not authorized to access the service.

Previous flows 350 include a record of a subscriber's previous requests. Previous flows 350 includes the time of a request, the description of the request, and the status of the request. The time of a request is when a request occurred. It should be noted that although the time scale is shown as partitioned for entitlement periods, it can be partitioned any number of ways including down to the millisecond level. Further, the range of the time scale can be anywhere from the total subscription time, the current billing cycle, or an entitlement period. Previous flows 350 can also include an explanation as to why a request was denied.

Satisfaction level 360 indicates the current satisfaction level of a subscriber. Satisfaction level can be based on analysis of previous flows 450 (e.g., percentage of requests allowed), feedback received from the subscriber, or a combination thereof. Satisfaction level 360 can be used as an indication of the likelihood the subscriber will change her service (e.g., upgrade service due to high satisfaction level, downgrade service due to low satisfaction level, cancel service due to extremely low satisfaction level, etc.).

Current RAN capabilities 370 indicate the capabilities of the RAN a subscriber is currently connected to. Current RAN capabilities 370 are useful in determining whether a request should be denied based on that fact that a RAN cannot support the request.

Roaming status 380 indicates whether roaming is active on for the device a subscriber is currently using to access a RAN.

Current device ID 382 identifies the device that a subscriber is currently using to connect to a RAN.

Device capabilities 384 identifies the capabilities of the device that a subscriber is currently using to connect to a RAN. Current device capabilities 484 are useful in determining whether a request should be denied based on that fact that the device cannot support the request.

Current service type 386 indicates the service that a subscriber is currently accessing.

IP address 388 indicates the IP address of the service that a subscriber is currently accessing, when applicable.

Current bandwidth allocation 390 indicates the bandwidth currently allocated to the subscriber both in the upstream and downstream directions. It should be noted that the bandwidth allocated to a subscriber may be greater than the bandwidth that the subscriber is actually using.

Signal quality 392 indicates the quality of the signals currently being received from the subscriber. Signal quality 392 is useful in determining that a subscriber's bandwidth allocation used should be modified based on the fact the subscriber will not be able to utilize all of allocated the bandwidth because the signal quality it too low. Further, a signal to noise ratio can be used to estimate bit error ratio ("BER"), which in turn can be used to estimate retransmission rates that use additional bandwidth capacity.

In an embodiment spectrum allocation decision module 254 generates bandwidth allocation policy decisions based on subscriber characteristics, as shown in subscriber profile 300. Spectrum allocation decision module 254 can include a library of decision algorithms that can use any combination of the subscriber characteristics identified in subscriber profile 300 to determine a bandwidth allocation policy decision.

In another embodiment spectrum allocation decision module 254 determines bandwidth allocation policy decisions based on subscriber characteristic and application service provider characteristics. When bandwidth allocation decision module 254 is determining a policy decision, an algorithm may be used in which the service provider characteristics may be used to override a subscriber's characteristics, or vice versa. For example, if a subscriber's entitlement level is bronze, while the service provider's entitlement level is gold, the gold entitlement level can be used to set the bandwidth allocated. Service provider characteristics may be obtained via service provider interface 258, and/or stored in service provider profile database 257.

FIG. 4 provides a diagram of exemplary service provider characteristics for a particular service provider, according to an embodiment of the invention. Exemplary service profile information is illustrated as service table 500. Service table 550 includes: an ID field, a service type field, an IP address field, a QoS upstream field, a QoS downstream field, and an entitlement field. These are exemplary fields, and not intended to limit the scope of the invention.

ID field identifies the service. Service type field specifies the type of service. In the exemplary embodiment services types include, but are not limited to: RT, NonRT, conversational, audio, and video. It would be appreciated by one of ordinary skill in the art that types of services are constantly expanding and can be incorporated into existing networks. IP address field indicates the IP address of the service that a subscriber is currently accessing, when applicable.

In the exemplary embodiment QoS upstream field specifies the amount of upstream bandwidth required by a service. It should be noted that QoS can also specify the optimal amount of bandwidth for a service. QoS upstream is useful when denying a user's request based on the fact that the subscriber's device cannot support the amount of bandwidth required by the service or the subscriber is not authorized to use the amount of downstream bandwidth required by the service.

In the exemplary embodiment QoS downstream field specifies the amount of downstream bandwidth required by a service. It should be noted that QoS can also specify the optimal amount of downstream bandwidth for a service. QoS upstream is useful when denying a user's request based on the fact that the subscriber's device cannot support the amount of downstream bandwidth required by the service or the subscriber is not authorized to use the amount of downstream bandwidth required by the service.

The entitlement field specifies the level of entitlement of a service. These entitlements are similar to the user entitlement described above, but are assigned to services. However, it should be noted that service entitlements can be obtained by a service provider paying the network provider for the entitlement. For example, if one type of video service wishes to be entitled over a competitor video service, the service provider can pay the network provider an entitlement fee. In this way the video service will have a greater likelihood of providing subscribers access when a conflict exists, such that system bandwidth is limited.

In an embodiment bandwidth allocation decision module 254 dynamically updates a bandwidth allocation policy decision for an ongoing service session based on changes in the subscriber or application service provider characteristics, wherein the updated bandwidth allocation policy decision is transmitted to a radio access network during a service session.

Information regarding applications and service providers providing those applications can be provided through service provider interface 258. Service provider interface 258 enables radio spectrum policy management server 250 to be communicatively coupled to one or more service providers that provide applications to subscribers. During the development of a policy decision following a service request, radio spectrum policy management server 250 can interact with an application service provider through the service provider interface 258 to receive and consider quality of service requests from a service provider.

Radio spectrum policy management server 250 can access subscriber profile database 256 to receive entitlement and subscriber information. In an embodiment, radio spectrum policy management server 250 is pre-provisioned with default subscriber and service profiles based on regionalization. Radio spectrum policy management server 250 can be a new network element or an existing element behind the core network.

Radio spectrum policy management server 250 can interface with the radio spectrum management server 240 via an AAA protocol such as Radius or Diameter. Radio spectrum policy management server 250 can interface with an edge server of the Core network and a bearer monitoring server such as a deep packet inspection ("DPI") a AAA protocol such as, Radius or Diameter or a Real-time simple control protocol such as, common open policy service ("COPS") COPS. Radio spectrum policy management server 250 can decide on actions to be sent to the core network edge server and/or a bearer monitoring server in terms of AAA protocol commands (e.g., change QoS, stop service, etc.). Radio spectrum policy management server 250 can decide on the actions to be sent to radio spectrum management server 240 in terms of AAA commands (change service, change queuing priority, etc.).

In an alternative embodiment, radio spectrum management system 250 may also include a subscriber usage analysis module 255 that analyzes subscriber usage information to predict spectrum allocation needs based on per subscriber service tier information.

Subscriber usage analysis module 255 provides a method for radio spectrum allocation that includes tracking and recording subscriber service usage related to service types and geographic use. This information is then analyzed to generate radio spectrum deployment plans based on the analyzed subscriber service usage information. By contrast, current spectrum allocation is based on the number of devices and geography without knowledge of specific subscriber requirements.

Figure 5:
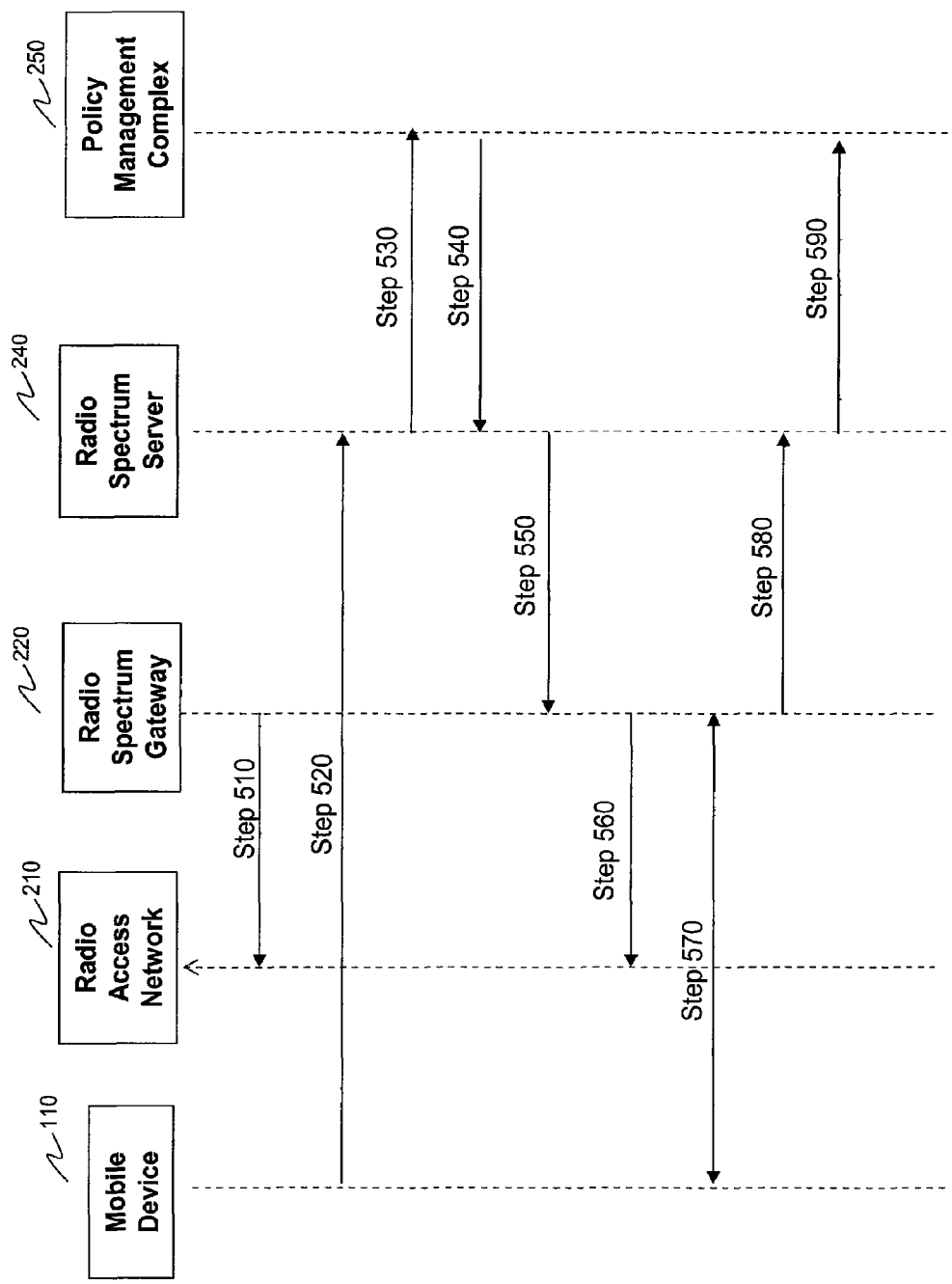
FIG. 5 provides a network signaling diagram for allocating radio spectrum for a subscriber within a wireless network, according to an embodiment of the invention.

FIG. 5 provides a method 500 for allocating radio spectrum for a subscriber within a wireless network, according to an embodiment of the invention. Method 500 begins in step 510.

In step 510 radio spectrum gateway 220 allocates minimal spectrum to allow association/authentication/authorization request from the subscriber's mobile device (e.g., mobile device 110).

In step 520, mobile device 110 sends an association/authentication/authorization request to radio spectrum management server 240 which contains encrypted authentication information to identify the subscriber and the device type.

In step 530, radio spectrum management server 240 forwards the authentication request to radio spectrum policy management server 250.

In step 540, radio spectrum policy management server 250 uses the subscriber authentication results and device information to decide on the required service level of the subscriber and forwards the bandwidth allocation policy decision to radio spectrum management server 240.

In step 550 radio spectrum management server 240 carries out resource admission based on the received bandwidth allocation policy decision and defines subscriber spectrum parameters and required diffsery markings for end-to-end QOS allocation and forwards this decision to radio spectrum gateway 220.

In step 560 radio spectrum gateway 220 adjusts the radio spectrum allocation accordingly on the radio side and marks the IP packets with diffsery markings on the non-radio side for packet forwarding to edge and other network routers.

In step 570 session termination (by either network or device) is detected by radio spectrum gateway 220. In steps 580 and 590, information related to the call (time, duration, service level) is forwarded to radio spectrum management server 240 and radio spectrum policy management server 250. Radio spectrum policy management server 250 stores the call usage information for use by the subscriber usage analysis module for future spectrum planning and policy decisions.

Figure 6:
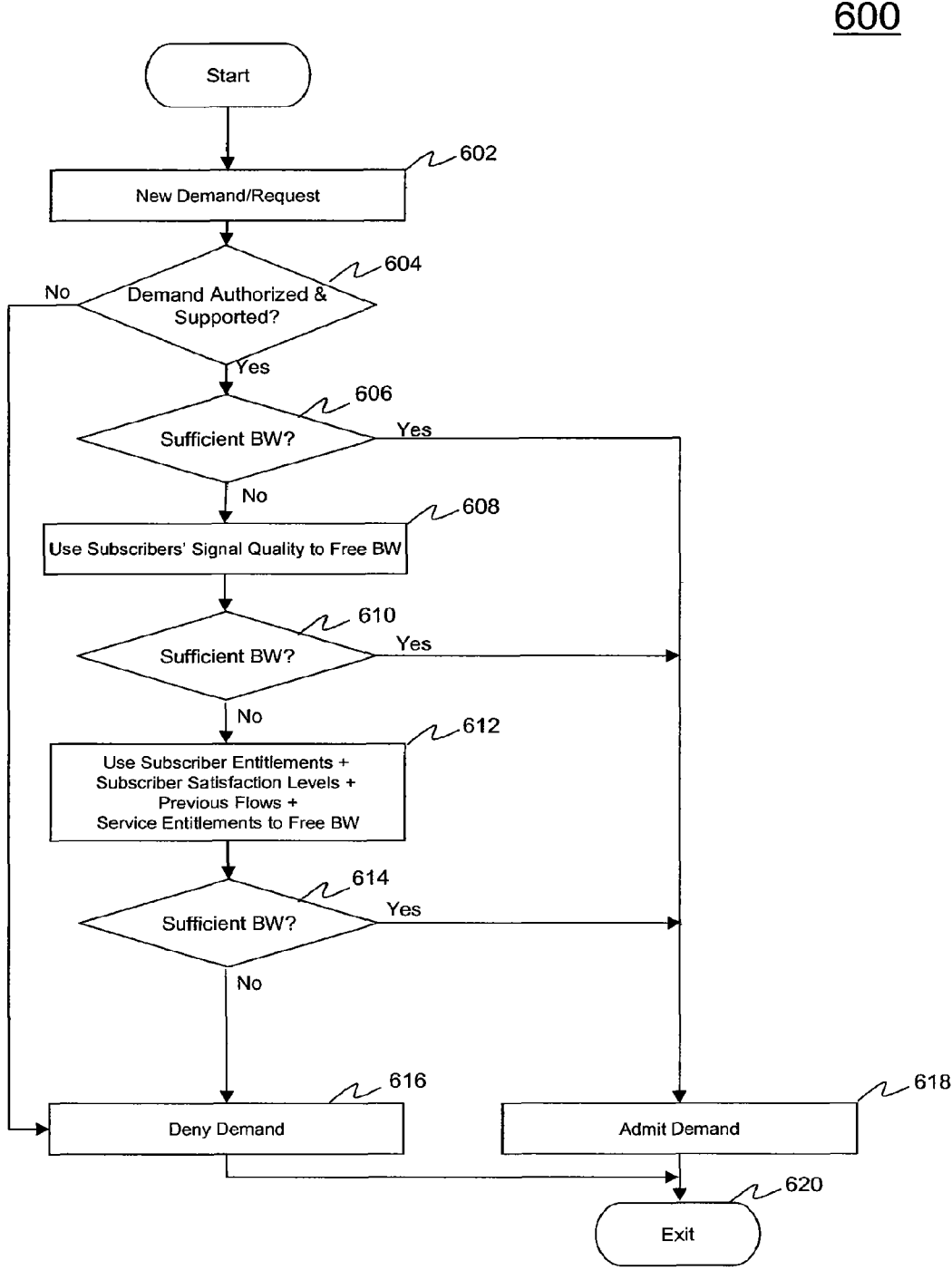
FIG. 6 provides a diagram of a method of dynamic bandwidth allocation based on subscriber characteristics and service provider characteristics, according to an embodiment of the invention.

FIG. 6 provides a diagram of a method of dynamic bandwidth allocation based on subscriber profile information and service profile information, according to an embodiment of the invention. Method 600 can be implemented in a signaling/data plane device.

Method 600 begins in step 602. In step 602 a subscriber connected to a RAN makes a request that requires more bandwidth than the amount of bandwidth currently being allocated to the subscriber. For example, if a subscriber is only allocated enough downstream bandwidth to support a voice conversation and the subscriber wishes to stream video, a new demand is created.

In step 604 a determination is made based on the subscriber characteristics whether the service being requested includes a service that the subscriber is allowed to use, if the subscriber's device supports the service, and if the current RAN supports the service. If any these authorization/support conditions are false method 600 continues to step 616. In step 616 the request is denied. Step 604 provides a way to end the processing of a subscriber's request based on the fact that there is no further need to process a subscriber's request when the request cannot be supported or is not authorized. If all of the authorization/support conditions are true, method 600 continues to step 606.

In step 606 a determination is made whether there is sufficient available bandwidth to support the subscriber's request. That is, a determination is made whether granting the subscriber's request would make the total allocated bandwidth of the network greater that a bandwidth threshold. In embodiments, such a determination may be made in either radio spectrum management server 240, radio spectrum policy management server 250 or in a combination of the two. It should be noted, as would be appreciated by one of ordinary skill in the art, that this threshold can be based on probability models associated with network traffic such that a likely amount of traffic at the time of the request can be supported. If there is sufficient bandwidth to accommodate the request, method 600 continues to step 618. In step 618, the request is permitted and a policy decision is generated to make available the requested bandwidth. Alternatively, upon a determination that bandwidth is available, method 600 may evaluate whether the requested bandwidth should be authorized based on the subscriber characteristics and/or service provider characteristics.

If a determination is made in step 606 that there is insufficient bandwidth available to adequately support the request, method 600 continues to step 608.

In step 608 the signal qualities of one or more subscribers accessing a RAN at the time of the request can be evaluated to determine if bandwidth can be reallocated to the subscriber making the request. For example, if the signal to noise ratio has increased sufficiently for another subscriber since bandwidth was initially allocated to the subscriber, it is likely that the subscriber will not be able to use the services for which the bandwidth was initially allocated. In this case, network bandwidth can be more efficiently used by reallocating the bandwidth to subscribers that will be able to effectively use the bandwidth. Bandwidth can be reallocated from one or more subscribers to the subscriber making the request. In an embodiment, step 608 is implemented in radio spectrum policy management server 250. Step 608 can be performed for a single subscriber before step 610 and subsequently repeated as necessary after step 610.

In step 610 a determination is made whether there is sufficient available bandwidth to support the subscriber's request. The determination made at step 610 is similar to the determination made at step 606. If there is sufficient bandwidth to accommodate the request, method 600 continues to step 618, and the bandwidth request is granted. If there is not sufficient bandwidth to accommodate the request, method 600 continues to step 612. It should be noted that steps 608 and 610 can be repeated as appropriate before method 600 continues to step 612.

In step 612 subscriber and/or service provider characteristics, such as, for example, entitlements, satisfaction levels, and previous flows of subscribers accessing the RAN can be analyzed along with the entitlements of services being accessed by the subscribers to determine whether bandwidth should be allocated to the subscriber making a new request. In an embodiment the policy decision analysis can involve quantizing entitlements, satisfaction levels, previous flows of subscribers accessing the RAN, and the entitlements of services being accessed by the subscribers and placing these factors into a weighted sum to generate a score for the subscribers accessing the network. Subscriber scores can be compared accordingly to reallocate bandwidth to the subscriber making the new request, and adjusting other subscriber's bandwidth allocations appropriately. In an embodiment, step 612 is implemented within radio spectrum policy management server 250. It should be noted that step 612 can be performed for a single subscriber before step 614 and subsequently repeated as necessary after step 614.

In step 614 a determination is made whether there is sufficient available bandwidth to support the subscriber's request. The determination made at step 614 is similar to the determination made at step 606. If there is sufficient bandwidth to accommodate the request, method 600 continues to step 618. If there is not sufficient bandwidth to accommodate the request, method 600 continues to step 612. It should be noted that steps 608 and 610 can be repeated as appropriate before method 600 continues to step 612.

In step 616 the subscriber's new request is denied. In an embodiment, the subscriber is notified as to why the request was denied.

In step 618 the subscriber's new request is admitted. In step 620 method 600 ends. While method 600 identifies determinations 608 and 612 occurring serially, each of these determinations can be made independently or in any order.

Computer System Implementation

Figure 7:
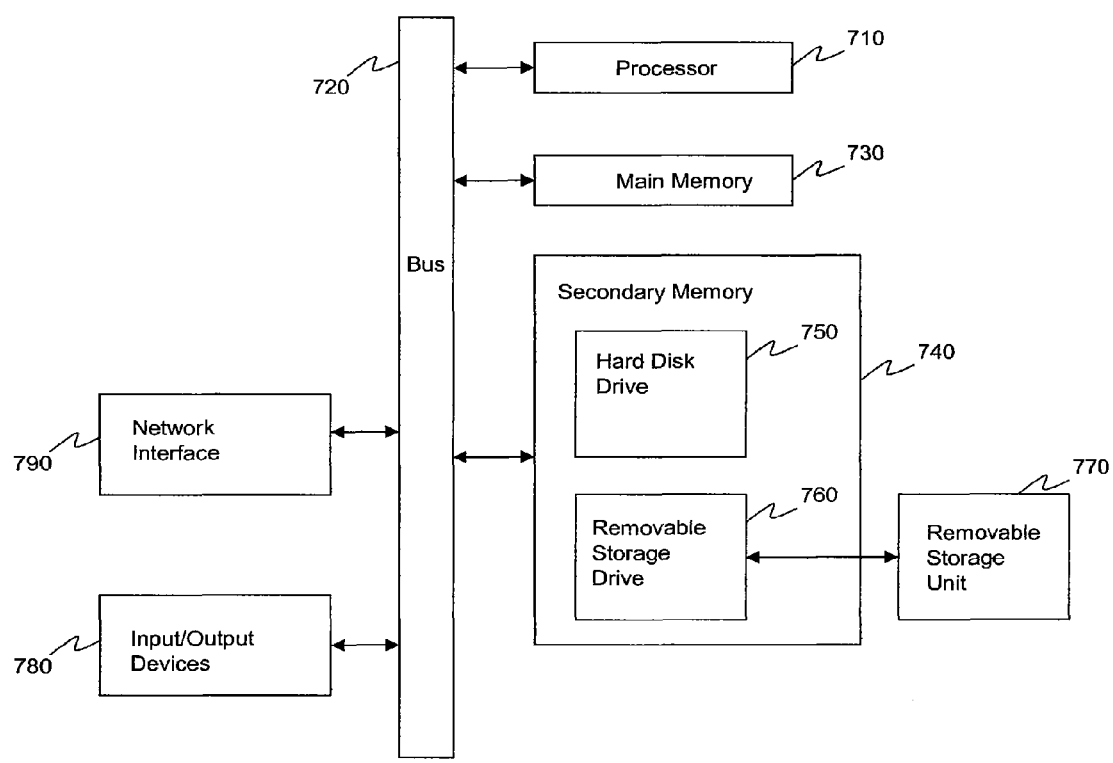
FIG. 7 provides a diagram of a computer system on which the methods and systems herein described can be implemented, according to an embodiment of the invention.

In an embodiment of the present invention, the methods and systems of the present invention described herein are implemented using well known computers, such as a computer 700 shown in FIG. 7. The computer 700 can be any commercially available and well known computer or server capable of performing the functions described herein, such as computers available from International Business Machines, Apple, Sun, HP, Dell, etc.

Computer 700 includes one or more processors (also called central processing units, or CPUs), such as processor 710. Processor 700 is connected to communication bus 720. Computer 700 also includes a main or primary memory 730, preferably random access memory (RAM). Primary memory 730 has stored therein control logic (computer software), and data.

Computer 700 may also include one or more secondary storage devices 740. Secondary storage devices 740 include, for example, hard disk drive 750 and/or removable storage device or drive 760. Removable storage drive 760 represents a floppy disk drive, a magnetic tape drive, a compact disk drive, an optical storage device, tape backup, ZIP drive, JAZZ drive, etc.

Removable storage drive 760 interacts with removable storage unit 770. As will be appreciated, removable storage unit 760 includes a computer usable or readable storage medium having stored therein computer software (control logic) and/or data. Removable storage drive 760 reads from and/or writes to the removable storage unit 770 in a well known manner.

Removable storage unit 770, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 700, or multiple computer 700s to perform any combination of the functions described herein Computer programs (also called computer control logic) are stored in main memory 730 and/or the secondary storage devices 740. Such computer programs, when executed, direct computer 700 to perform the functions of the present invention as discussed herein. In particular, the computer programs, when executed, enable processor 710 to perform the functions of the present invention. Accordingly, such computer programs represent controllers of the computer 700.

Computer 700 also includes input/output/display devices 780, such as monitors, keyboards, pointing devices, etc.

Computer 700 further includes a communication or network interface 790. Network interface 790 enables computer 700 to communicate with remote devices. For example, network interface 790 allows computer 700 to communicate over communication networks, such as LANs, WANs, the Internet, etc. Network interface 790 may interface with remote sites or networks via wired or wireless connections. Computer 700 receives data and/or computer programs via network interface 790. The electrical/magnetic signals having contained therein data and/or computer programs received or transmitted by the computer 700 via interface 790 also represent computer program product(s).

The invention can work with software, hardware, and operating system implementations other than those described herein. Any software, hardware, and operating system implementations suitable for performing the functions described herein can be used.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

What is claimed is:

1. A radio spectrum management system, comprising:
a radio spectrum gateway coupled to a radio access network that receives bandwidth requests from subscriber devices and provides bandwidth allocation decisions to the radio access network;
a radio spectrum management server that receives bandwidth requests from the radio spectrum gateway and provides bandwidth allocation decisions to the radio spectrum gateway based on radio resources and bandwidth policy decisions; and
a radio spectrum policy management server that provides bandwidth policy decisions to the radio spectrum server based on characteristics of a requesting subscriber, the characteristics including one or more of subscription information, historical usage information and current usage information that are associated with the subscriber, where the subscription information includes entitlements, allowed service types, allowed device identifiers, allowed subscription identifiers, and billing information.

2. The radio spectrum management system of claim 1, further comprising a subscriber profile database that can be enabled to include subscriber characteristics.

3. The radio spectrum management system of claim 1, wherein the bandwidth allocated to a user for a requested service is based on one or more of a subscriber profile, a subscriber device, application provider profile of an application provider providing the requested service, and a service requested.

4. A method, comprising:
receiving by a radio spectrum gateway coupled to a radio access network bandwidth requests from subscriber devices and providing by the radio spectrum gateway bandwidth allocation decisions to the radio access network;
receiving by a radio spectrum management server bandwidth requests from the radio spectrum gateway and providing by the radio spectrum management server bandwidth allocation decisions to the radio spectrum gateway based on radio resources and bandwidth policy decisions; and
providing by a radio spectrum policy management server that bandwidth policy decisions to the radio spectrum server based on characteristics of a requesting subscriber, the characteristics including one or more of subscription information, historical usage information and current usage information that are associated with the subscriber, where the subscription information includes entitlements, allowed service types, allowed device identifiers, allowed subscription identifiers, and billing information.

5. A method for dynamically allocating radio spectrum to a first subscriber within a wireless network from a second subscriber within the wireless network comprising:
allocating bandwidth to the first subscriber from a second subscriber, based on a determination that bandwidth allocated to the second subscriber no longer efficiently supports a use for which it was allocated due to a reduction in signal quality;
allocating bandwidth to the first subscriber from the second subscriber based on a comparison of respective subscriber entitlements, respective subscriber satisfaction levels, and respective application service provider entitlements;
receiving a request for an application from the first subscriber;
generating a bandwidth allocation policy decision based on characteristics of the first subscriber and characteristics of an application service provider that provides the requested application;
receiving a request from the application service provider for a specific quality of service; and
factoring the request for the specific quality of service into a decision process for generating a service profile.

* * * * *